United States Patent [19]

Ocnaschek et al.

[11] 3,805,192

[45] Apr. 16, 1974

[54] FREQUENCY MODULATOR-VARIABLE FREQUENCY GENERATOR

[75] Inventors: Frank Joseph Ocnaschek; Eugene Robert Wade, both of St. Petersburg, Fla.

[73] Assignee: Electronic Communications, Inc., St. Petersburg, Fla.

[22] Filed: Aug. 9, 1972

[21] Appl. No.: 279,280

[52] U.S. Cl. .................. 332/16 R, 325/419, 331/25, 332/14

[51] Int. Cl. .......................... H03c 3/02, H03b 3/04

[58] Field of Search ............ 332/9 R, 9 T, 14, 16 R, 332/16 T; 331/18, 23, 25, 179; 325/38 R, 38 B, 38 A, 142, 163, 164, 419; 178/66 R

[56] References Cited

UNITED STATES PATENTS

| | | | |
|---|---|---|---|
| 3,354,403 | 11/1967 | Thomas | 331/18 |
| 3,551,826 | 12/1970 | Sepe | 331/25 |
| 3,713,017 | 1/1973 | Vena | 332/9 R |
| 3,337,814 | 8/1967 | Brase et al. | 331/18 |
| 3,370,252 | 2/1968 | Zoerner | 331/25 X |
| 3,588,730 | 6/1971 | Schreuer | 331/25 X |

*Primary Examiner*—Alfred L. Brody

*Attorney, Agent, or Firm*—Sandoe, Hopgood and Calimafde

[57] ABSTRACT

A frequency modulator/variable frequency source employs an electronically programmable divider in the feedback path of a phase locked loop. The phase locked loop is stabilized by the output of a fixed frequency oscillator. The effective divider modulus is directly determined by a variable duty cycle signal which alternately switches the divider between two characteristic count capacities with relative dwell periods determined by a modulating potential.

The output wave frequency is determined by the product of the fixed oscillator frequency and the effective feedback divider modulus, and thus varies directly with modulating potential.

9 Claims, 1 Drawing Figure

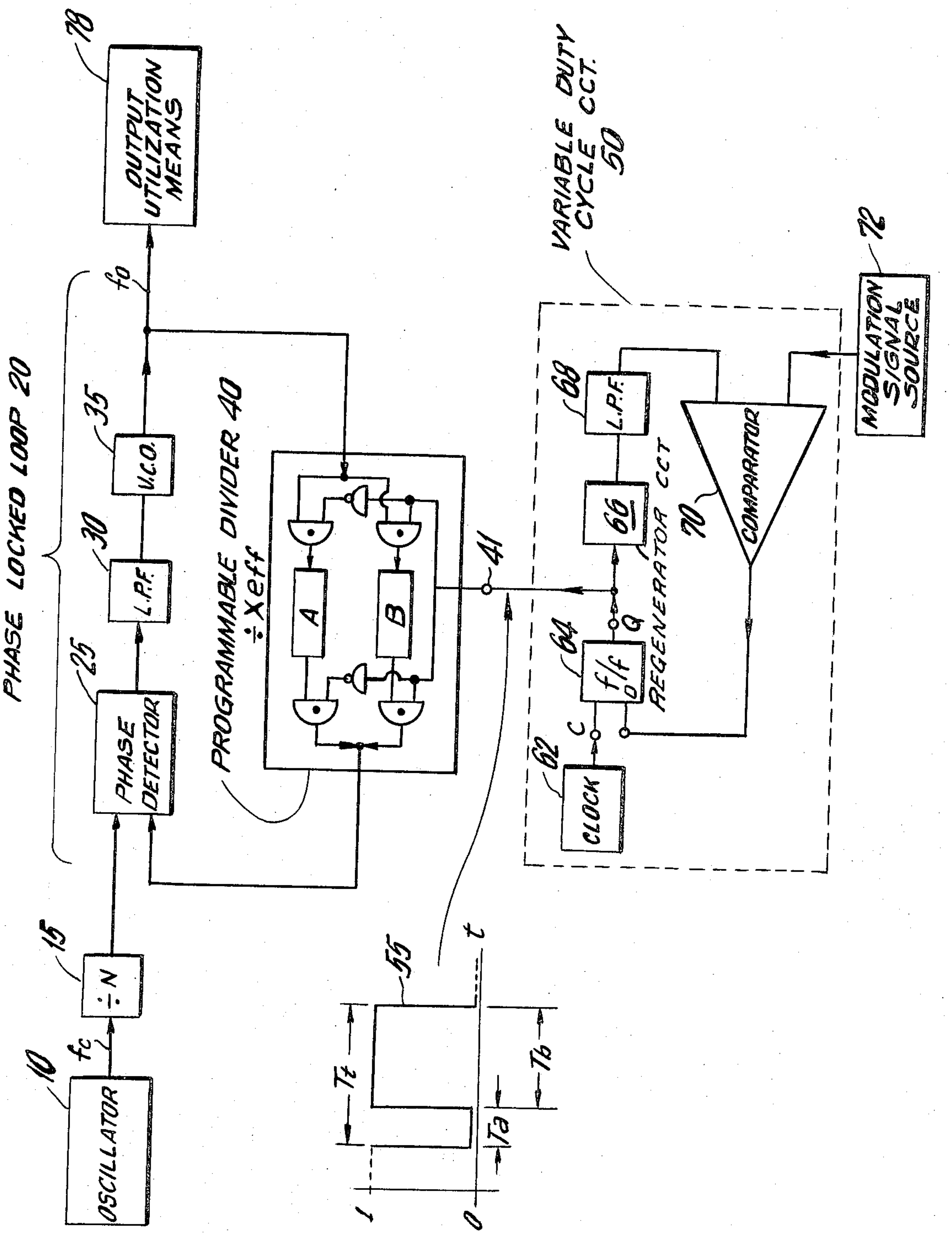
OSCILLATOR
10
fc
÷N
15
PHASE DETECTOR
25
L.P.F.
30
V.C.O.
35
fo
OUTPUT UTILIZATION MEANS
78
PHASE LOCKED LOOP 20
PROGRAMMABLE DIVIDER 40
÷ Xeff
A
B
41
VARIABLE DUTY CYCLE CCT. 50
CLOCK
62
C
f/f
D
Q
64
REGENERATOR
66
REGENERATOR CCT
L.P.F.
68
COMPARATOR
70
MODULATION SIGNAL SOURCE
72
55
Tt
Tb
Ta
1
0
t

FREQUENCY MODULATOR-VARIABLE FREQUENCY GENERATOR

DISCLOSURE OF THE INVENTION

This invention relates to electronic circuits and, more specifically, to an improved frequency modulator/variable frequency source circuit arrangement.

Various circuit configurations have been utilized to modulate a carrier oscillation in frequency in accordance with a modulation signal. Included among these is a phase locked loop wherein the frequency of an input clock wave is multiplied by the modulus of a divider (e.g., an overflow counter) in the loop feedback path. The analog modulating potential is linearly combined with the output (filtered) of the loop phase detector, thereby controlling the phase and frequency of the output wave.

However, the response of the prior art phase locked loop arrangement to low modulation frequencies is limited. Specifically, the arrangement cannot accommodate DC modulation signal components since the two inputs to the phase detector must be equal in frequency over any extended time period. Similarly, the phase locked loop cannot respond to low frequency modulating signal components as well.

Accordingly, when DC or low frequency response is desired, the phase locked loop approach has been abandoned in favor of various frequency discriminator arrangements and the like. These latter approaches are relatively complex, and they suffer from frequency instability and alignment difficulties.

It is thus an object of the present invention to provide an improved frequency modulator/variable frequency source.

More specifically, it is an object of the present invention to provide a circuit arrangement for supplying an output frequency which is accurately determined; and which may be continuously varied over a wide range of frequencies including zero frequency or "direct current."

The above and other objects of the present invention are realized in a specific illustrative frequency modulator/variable frequency generator wherein a fixed frequency oscillation is supplied as an input to a phase locked loop. The phase locked loop includes an output voltage controlled oscillator (VCO) whose frequency is regulated by the output of a phase detector, and an electronically programmable divider in the loop feedback path connecting the VCO and a second input of the phase detector.

The divider exhibits one of two distinctive count moduli depending upon the state of a binary control signal supplied thereto. The effective divider modulus, and thereby also the loop output frequency, is determined by the relative dwell times of the divider in its two count modes. The form of the counter controlling signal, in general comprising a nonsymmetrical and, possibly also, asynchronous digital wave is, in turn, determined by the amplitude of a modulating potential.

A complete understanding of the present invention, and of its above discussed and other features and advantages, will become readily apparent from the following detailed description of an illustrative embodiment thereof, which is schematically depicted in the accompanying drawing.

Referring now to the drawing, there is shown a frequency modulator for supplying an output frequency $f_o$ to output utilization means 78 which varies with, and is determined by a modulation signal supplied by a source 72 thereof, e.g., of analog form. As used herein the term "frequency modulator" or the like identifies apparatus wherein the frequency of an output wave is determined by a control ("modulation") signal, and encompasses both frequency modulators per se and variable frequency signal sources.

The frequency modulator includes a highly stable fixed frequency oscillator 10, e.g., of crystal controlled construction, which supplies a periodic wave of frequency $f_c$ to a divider 15 of fixed modulus N. The elements 10 and 15 thus supply a digital wave of frequency $f_c/N$ to the input of a phase locked loop 20. As conventional for such structures, the loop 20 includes a digital phase detector 25 and a low pass filter 30 (which may also include amplification) for controlling the frequency of a voltage controlled oscillator (VCO) 35. A divider 40 (of effective count modulus $X_{eff}$) connects the output of the VCO 35 and a second input of the phase detector 25.

The operation of phase locked loops is well known, and will not be described in detail herein. In brief, the phase detector (e.g., a bistable circuit driving a low pass filter and amplifier) provides an output feedback error signal which automatically sets the VCO to whatever oscillation frequency $[f_c\ (X_{eff}/N)]$ is necessary such that, after division by the factor $X_{eff}$ in divider 40, the feedback return signal is the same in frequency as the wave supplied by the oscillator 10 and the counter 15 ($f_c/N$). Basically, such circuit operation is effected by an automating shifting of the phase of the two like frequency input waves vis-a-vis one another.

In accordance with one basic aspect of the present invention, continuous control over the frequency $f_o$ of the circuit output wave is accomplished by providing continuous control over the effective modulus $X_{eff}$ of the programmable divider 40. To this end, the divider 40 is made electronically programmable, i.e., it operates with one of two discrete count capacities A or B depending upon the value of a binary control signal supplied to a divider input port 41, wherein $A<X_{eff}<B$ (assuming $B>A$).

Specific structures for divider 40 will be readily apparent to one skilled in the art. Thus, two separate counters of modulus A and B may be employed, with the input and output of only one counter gated for operative connection by the signal at port 41, or its inverse. The counter may also comprise $n$ binary counter stages, where gating is employed to reduce the counter modulus below $2^n$ for at least the lower count capacity in the manner well known. The specific operative gate connection(s) are varied by the control signal at the port 41 to provide the requisite two distinct count capacities.

A variable duty cycle circuit 50 is employed to supply a digital wave 55 to the control port 41 of divider 40. When wave 55 is in one binary state, e.g., "0," the divider 40 exhibits capacity A; the modulus B obtains while a "1" level signal is present. In the wave 55, the relative dwell periods T$a$ and T$b$ in the "0" and "1" states, i.e., the duty cycle of the wave 55, are determined by the amplitude of the modulating wave produced by the source 72. The effective count modulus $X_{eff}$ of the divider 40 is thus given by $$X_{eff} = A(Ta/Tt) + B(Tb/Tt) = (Ta/Tt)\ (A-B) + B \qquad (1)$$

where $Tt$ is the period of the wave 55, and A, B, $Ta$ and $Tb$ are defined above. Thus, the circuit output frequency $$f_o = (1/N) \times [(Ta/Tt)\ (A-B) + B] \qquad (2)$$

directly depends on the duty cycle of the wave 55 and, ultimately, on the modulating potential.

Many embodiments for the controlled variable duty cycle generating circuit 50 will be apparent to those skilled in the art. The embodiment shown in the drawing includes a clock source 62 (which may comprise the output from oscillator 10) connected to the clock input of a D-type (i.e., edge triggered) flip-flop 64. The output of the flip-flop 64 is regenerated, and shifted in level by circuit 66 (to provide accurate upper and lower binary amplitudes as by Zener diode regulation), and the shaped shifted wave filtered in element 68. The output of the filter 68, and the modulating potential are supplied as inputs to a comparator 70, which is connected to the "0" input of the flip-flop 64.

The circuit 50 operates in a manner much like a "non-linear" servo loop in automatically producing at the output of flip-flop 64 the asymmetry (in general) required such that the two inputs to comparator 70 (the feedback loop difference element) are balanced. Thus, as the amplitude of the modulating signal increases and decreases, the periods Ta and Tb change in a corresponding amount such that the output of the low pass filter 68 matches the modulation potential. Accordingly, the modulation potential directly controls the duty cycle of the wave at the output (Q) terminal of the flip-flop 64.

Alternatively, the variable duty cycle can be synthesized directly, as by the modulating potential controlling the period of a VCO which, in turn, drives a monostable multivibrator of fixed timing (e.g., PWM; alternatively, the period may be fixed, and the one-shot interval voltage controlled by the modulation potential).

Thus, the circuit arrangement of the drawing has been shown by the above to provide direct continuous control over output wave frequency $f_o$ by a modulation potential supplied by a source 72 thereof. The modulation potential can include frequencies from DC (fixed redistribution of the A—B count dwell intervals) to high frequencies limited only by the VCO modulation frequency response. Further, the frequency deviation bounds are limited only by the count interval established between the A and B parameters (assuming a sufficient pulling range from the VCO 35). Thus, A and B can be consecutive counts M and M+1 when a very fine output frequency gradation is desired, or A and B can be made widely disparate for a wide deviation.

The above described arrangement is merely illustrative of the principles of the present invention. Numerous modifications and adaptations thereof will be readily apparent to those skilled in the art without departing from the spirit and scope of the present invention. For example, the divider 40, programmed by the variable duty cycle circuit 50 and the modulation source 72 may be employed per se, without the phase locked loop, to produce a continuously variable output frequency by effecting a variable division rather than comprising a variable multiplier factor.

What is claimed is:

1. In combination, a variable modulus divider having an effective count capacity dependent upon a modulating signal and comprising a source of modulating signal, means connected to said modulating signal source for generating an output wave having a duty cycle which is dependent upon the modulating signal supplied by said source thereof, digital divider means having a first and second characteristic count modulus, and means, responsive to the duty cycle dependent wave, for operatively selecting said first or second count modulus.

2. A frequency modulator/variable frequency source comprising in combination the variable modulus divider of claim 1, a phase locked loop, said loop including an input, an output, and a feedback path, said divider being included in the feedback path of said loop and an oscillator connected to the input of said phase locked loop.

3. A combination as in claim 2 wherein said phase locked loop includes a phase detector and a voltage controlled oscillator.

4. A combination as in claim 2 further comprising additional divider means connected to the input of said phase locked loop.

5. A combination as in claim 2, further comprising output utilization means connected to said phase locked loop.

6. A combination as in claim 2 wherein said oscillator includes a source of constant frequency.

7. A combination as in claim 1 wherein said variable duty cycle generating means comprises a flip-flop, a low pass filter and a comparator.

8. In combination, a phase locked loop including a phase detector, a voltage controlled oscillator connected to said phase detector, divider means having a count modulus electronically variable between two values connecting said voltage controlled oscillator and said phase detector, reference oscillation source means connected to said phase detector, and means for alternately varying the modulus of said divider between said two values therefor.

9. A combination as in claim 8 further comprising a source of modulation signals, and wherein said modulus varying means comprises means for varying said divider count modulus between said two values therefor responsive to said modulation signal supplied by said source thereof.

* * * * *